Sept. 20, 1932.　　　　S. ARONOFF　　　　1,878,658
WATTHOUR METER TESTING DEVICE
Filed April 3, 1929　　2 Sheets-Sheet 1

INVENTOR
Samuel Aronoff.
BY
ATTORNEY

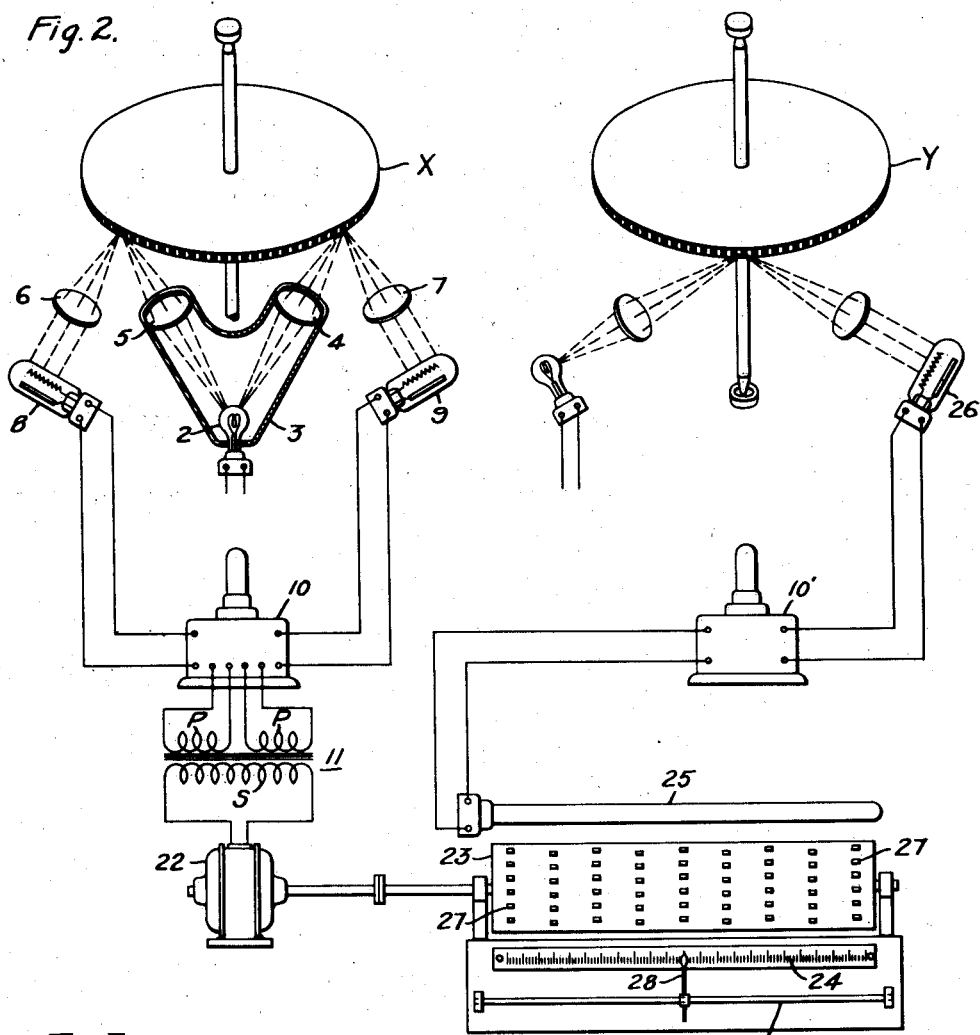
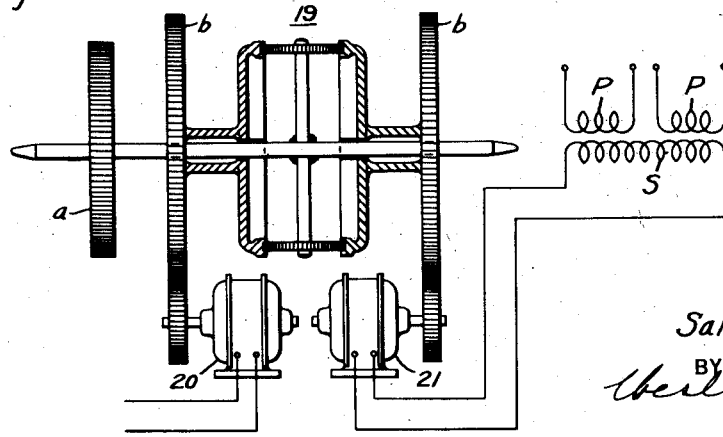

Patented Sept. 20, 1932

1,878,658

UNITED STATES PATENT OFFICE

SAMUEL ARONOFF, OF NEWARK, NEW JERSEY, ASSIGNOR TO WESTINGHOUSE ELECTRIC
& MANUFACTURING COMPANY, A CORPORATION OF PENNSYLVANIA

WATTHOUR METER TESTING DEVICE

Application filed April 3, 1929. Serial No. 352,141.

My invention relates to a method of and means for automatically operating a control element directly in accordance with the operation of a reference element.

It is characteristic of my invention that no mechanical load is placed on the reference element, thereby providing accurate means for testing a rotating meter element of delicate construction.

It is further characteristic of my invention that beams of light are flickered at a speed directly proportional to the speed of motion of a reference element. Such flickering beams operate light-sensitive cells that emit current impulses proportional to the frequency of the flickering light. The output current from the cells is amplified and connected either to an oscillating-type synchronous motor or to a special transformer in such manner as to produce an alternating current to operate a control, such as a synchronous motor, that rotates in synchronism with the reference element.

It is still further characteristic of my invention that the speeds of two rotating elements may be compared automatically.

My invention is particularly applicable to the testing of rotating machines, such as induction-type watthour meters embodying rotating disc armatures, and it will be described in connection with such meters, as a preferred embodiment.

My invention may be more fully understood, however, if the accompanying drawings are consulted in connection with the following description.

In the drawings:

Fig. 2 is a view, similar to Fig. 1, of a stroboscopic device for comparing the speeds of a plurality of rotating elements in accordance with my invention, and Fig. 3 is a view, partially in side elevation, partially in section and partially schematic, of a further modification of my invention for comparing the relative speeds of two rotating elements.

Figure 1:
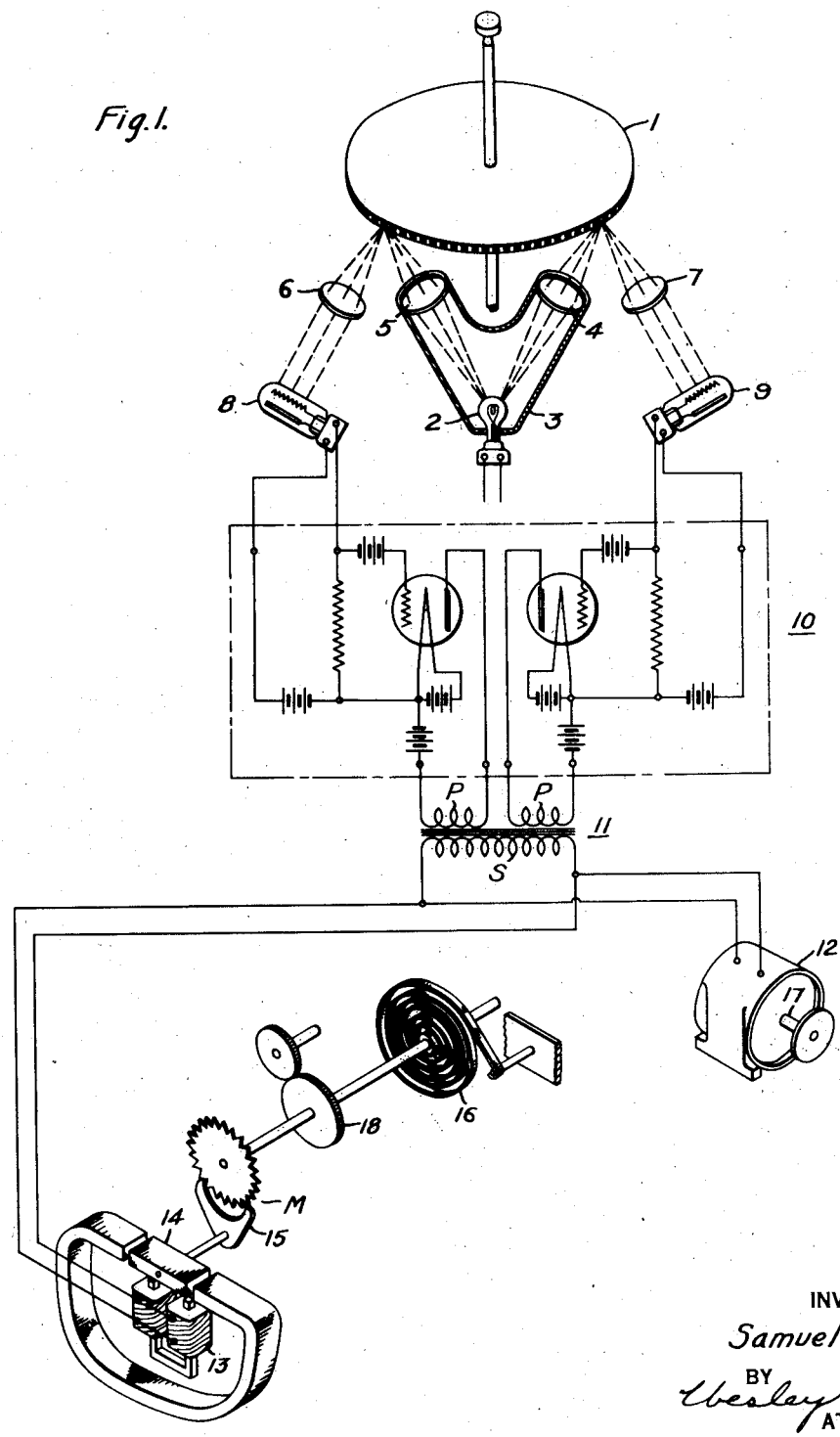
Figure 1 is a schematic, partially perspective, diagram of a preferred application of my invention for operating a control in accordance with the speed of rotation of a watthour meter.

Referring to Fig. 1, a rotating disc 1 of a watthour meter has, on its periphery, a suitable number of alternate light-absorbing and light-reflecting spaces arranged in any suitable manner. A source of light, such as a lamp 2, is enclosed in a properly shaped housing 3 that is provided with two openings for light-condensing lenses 4 and 5. The lenses 4 and 5 are so positioned that, when the lamp 2 is energized, its light flux passes through the lenses and is condensed by the same into substantially two beams of high intensity that are focused on the periphery of the disc 1. The spacing between the foci is such that, when one beam of light strikes the light-reflecting portion of the disc, the other beam of light strikes the light-absorbing portion.

As the disc 1 rotates, each of the aforementioned beams of light is alternately reflected and absorbed by the bright and dark portions of the disc. Such absorptions and reflections are in successive order at the two points of light concentration. In such manner, a light flicker is created at the focal points of the lenses 4 and 5 that alternate with respect to each other and are proportional to the speed of rotation of the disc 1.

The flickering light, above referred to, that is obtained by either reflection or projection, is impinged upon light-sensitive cells 8 and 9 through intermediary lens systems 6 and 7, respectively. The current output of the cells is in the form of alternate pulsations the frequency of which is directly proportional to the speed of rotatiton of the disc 1.

The output of the cells 8 and 9 is amplified by means of a three-element vacuum-tube unit 10 shown in such form as to permit analysis without attempting to describe, in detail, its elements or its operation.

The output of the amplifier 10 is then impressed upon a double-primary-coil transformer 11, as shown. The voltage of the secondary S of the transformer 11 alternates at a frequency proportional to the speed of rotation of the disc 1, because of the alternate-opposite-energization of the primaries P of the transformer. Such secondary voltage may be impressed upon any suitable control, such as a synchronous motor 12 or an escapement motor M. The speed of rotation of the synchronous motor 12 is directly proportional to the speed of rotation of the disc 1 because the motor operates in synchronism with the alternating voltage from the transformer 11.

The escapement motor M may be employed instead of the synchronous motor 12. The former comprises an electromagnet 13 that oscillates a polarized armature 14 in accordance with the speed of rotation of the disc 1. As the armature 14 oscillates, it permits a wheel 18 to revolve under the influence of a spring 16 by the operation of an escapement mechanism 15. It is apparent from the above that the shaft 17 of the synchronous motor 12 or the wheel 18 of the escapement motor M turns at a speed that is directly proportional to the speed of the reference element or disc 1.

My device is useful in a number of different applications of which the following are examples:

Totalizing the revolutions of a plurality of rotative elements and, particularly, totalizing the registration of independent watthour meters. This is illustrated in Fig. 3 as accomplished by a differential mechanism 19 that is operated by independent synchronous motors 20 and 21 similar to the motor 12 shown in Fig. 1.

Each of the motors 20 and 21 is operated by a system similar to that shown in Fig. 1, from and in proportion to the speed of operation of two independently rotating disc elements, such as disc 1 of Fig. 1. The motors 20 and 21 are directly coupled to gear wheels $b$ of the differential mechanism 19 which operate wheel $a$ at a speed proportional to the sum or difference of the speeds of the motors 20 and 21. Smooth operation of the differential is thus accomplished without imposing load on either the reference disc or the standard meter disc where the differential is used to indicate percent registration of a test meter with reference to a standard meter.

Another application of my device is the transmission and registration and indication of operation of meters to points remote from the metering center. Such operation is possible because the motor 12 runs at a speed proportional to the speed of the armature of the meter.

A still further application of my device is its use to determine the relative speeds between two independently rotating elements for the purpose of determining the percent registration of a meter, as compared with a standard meter.

A system for accomplishing the purpose just mentioned is illustrated in Fig. 2. A synchronous motor 22 operates at a speed proportional to the speed of a reference element X, such as a watthour-meter disc, in the manner described above in connection with Fig. 1. A neon-gas-filled lamp 25, in the shape of an elongated tube, is energized intermittently in accordance with the speed of another meter element Y, such as a watthour-meter disc, by means of a photo-electric cell 26 and an amplifier 10'; that is operated by light impulses caused by the rotation of the element Y, in the manner described above.

A cylinder 23 is coupled directly to, and is driven by, the motor 22. On the drum 22 are a plurality of bands 27, each consisting of a plurality of marks corresponding to different speeds likely to occur between the elements X and Y. The cylinder 23 rotates at a speed proportional to the speed of the element X, and the lamp 25 flickers in accordance with the speed of the element Y. A point of stroboscopic synchronism may be observed between one of the bands 27 on the cylinder 23 and the intermittent light when such band has a number of marks changing at a frequency corresponding to the frequency of the light.

A scale 24, calibrated in percent registration of Y with respect to X, is mounted adjacent to the cylinder 23. A manually movable pointer 28, mounted on slide 29, may be employed to aid in determining the exact position of stroboscopic synchronism between the bands of marks.

My invention is advantageous over prior schemes in that results are obtained without placing any additional burden on the measuring apparatus. In addition, my method is simple, and final results may be obtained quickly and accurately without any time element intervening, all operations being accomplished automatically.

I claim as my invention:

1. The combination with a rotating element and an electric circuit separate therefrom, of means for generating an alternating current in said circuit having a frequency proportional to the speed of said rotating element comprising a plurality of thermionic tubes, light-sensitive means operated by said element for alternately energizing said tubes, means for energizing said circuit in opposite directions with successive energizations of said tubes and indicating means responsive thereto.

2. The combination with a rotating element having alternate light-absorbing and light-reflecting surfaces on the periphery thereof, of a source of light directing light rays to a plurality of points on said periphery, photo-electric cells positioned to be operated by light rays reflected from said points on said element, said points being designed to cause said reflected rays to operate said cells alternately in accordance with the speed of said element, an electric circuit energized by said cells and indicating means responsive thereto.

3. In combination, a plurality of separate rotatable members, means for rotating a marked element in accordance with the speed of one of said rotating members, means for lighting a lamp stroboscopically coacting with said marked element intermittently in accordance with the speed of another of said rotatable members, and means calibrated in a function of the percent ratio of speed between said members associated with said marked element.

4. In combination, a pair of independently rotating members, a rotatable element bearing a plurality of marks arranged successively in sets the marks of each set being spaced equally but differently than the marks of any other set, a light source mounted adjacent said rotatable element, means for rotating said element in accordance with the speed of one of said rotating members, means for energizing said light source at a frequency corresponding to the speed of the other rotating member and means calibrated according to a function of the percent ratio of speed between said members associated with said marked element.

5. In combination, a rotating element having alternate light-absorbing and light-reflecting surfaces on the periphery thereof, a source of light directing light rays to a plurality of points on said periphery, photoelectric cells, said light source and photo electric cells being so positioned with reference to said periphery that the photo-electric cells are alternatively illuminated as said element rotates, a circuit, means for generating an alternating current in said circuit of a frequency in accordance with the alternate illumination of said cells, and indicating means responsive thereto.

In testimony whereof, I have hereunto subscribed my name this 9th day of March, 1929.

SAMUEL ARONOFF.